United States Patent [19]

Reichel et al.

[11] 4,057,037

[45] Nov. 8, 1977

[54] SPARK-IGNITED INTERNAL COMBUSTION ENGINE OPERATED WITH CHARGE STRATIFICATION

[75] Inventors: Kurt Reichel, Wolfsburg; Gerd Decker, Vorsfelde; Alfred Kuck, Isenbuttel; Erwin Schulz, Gifhorn, all of Germany

[73] Assignee: Volkswagenwerk Aktiengesellschaft, Germany

[21] Appl. No.: 632,699

[22] Filed: Nov. 17, 1975

[30] Foreign Application Priority Data

Nov. 21, 1974 Germany .......................... 2455070

[51] Int. Cl.² ............................................ F02B 19/10
[52] U.S. Cl. ......................... 123/32 SP; 123/32 AA; 123/32 J; 123/191 SP; 123/32 ST
[58] Field of Search ............ 123/32 AA, 32 J, 32 SP, 123/32 ST, 32 C, 191 S, 191 SP

[56] References Cited

U.S. PATENT DOCUMENTS

| | | | |
|---|---|---|---|
| 2,561,628 | 7/1951 | Kogel | 123/32 C |
| 3,884,211 | 5/1975 | Yagi et al. | 123/32 SP |
| 3,921,607 | 11/1975 | Kawamoto | 123/32 SP |
| 3,930,471 | 1/1976 | Leonard et al. | 123/32 SP |
| 3,954,088 | 5/1976 | Scott | 123/32 SP |
| 3,968,782 | 7/1976 | Noguchi et al. | 123/191 SP |
| 3,974,818 | 8/1976 | Noguchi et al. | 123/32 SP |

Primary Examiner—Ronald H. Lazarus
Assistant Examiner—David D. Reynolds
Attorney, Agent, or Firm—Brumbaugh, Graves, Donohue & Raymond

[57] ABSTRACT

An internal combustion engine with charge stratification and spark ignition comprises a cylinder head having a main combustion chamber and a cavity defined by surrounding walls of the cylinder head and opening toward the main combustion chamber. An auxiliary combustion chamber is formed within a cup-shaped insert frictionally maintained in the cavity and opening away from the main combustion chamber. The cup-shaped insert is thin-walled and has an opening providing a passage connecting the main combustion chamber and the auxiliary combustion chamber and a pair of openings for receiving a fuel delivery device and an ignition device, respectively.

10 Claims, 2 Drawing Figures

SPARK-IGNITED INTERNAL COMBUSTION ENGINE OPERATED WITH CHARGE STRATIFICATION

BACKGROUND OF THE INVENTION

The present invention relates essentially to a spark-ignited internal combustion engine operated with charge stratification, and, more particularly, to an internal combustion engine including a cylinder head having a main combustion chamber and an auxiliary combustion chamber connected to the main combustion chamber. The auxiliary combustion chamber is formed within a cup-shaped, thin-walled insert positioned in a cavity of the cylinder head, the insert having an opening providing a passage connecting the main combustion chamber and the auxiliary combustion chamber and a pair of openings for receiving an ignition device and a fuel delivery device.

A spark-ignited internal combustion engine operated with charge stratification and described in German Offenlegungsschrift No. 2,327,703 comprises a cylinder head having a cavity accommodating a cup-shaped insert which delimits an auxiliary combustion chamber, the cavity opening away from a main combustion chamber. The cavity also accommodates a valve seat for an auxiliary intake valve which delivers a fuel-air mixture, comparatively rich in fuel content, to the auxiliary combustion chamber. Since the cup-shaped insert also opens away from the main combustion chamber, it must be introduced into the cylinder head from above and maintained therein along with the valve seat. The closed-end of the insert is located substantially adjacent the main combustion chamber and includes an opening aligned with a connecting channel which communicates with the main combustion chamber.

At low operating temperatures (i.e., during the cold-starting and warming-up phases of the engine) the insert is spacedly positioned in the cavity, a distance from the surrounding walls of the cylinder head. At higher operating temperatures produced when the engine is operating at higher loads, the insert expands and contacts the surrounding walls of the cylinder head. Thus, at high operating temperatures, the large quantity of heat produced, especially in the vicinity of the connecting channel communicating with the main combustion chamber, is transferred rapidly from the insert to the surrounding walls of the cylinder head so that the temperature of the insert does not exceed a predetermined maximum temperature.

However, one disadvantage of such an internal combustion engine is that the combustion residues, such as soot and the like, produced especially during the warming-up phase of the engine (i.e., when the engine has not yet attained sufficient operating temperatures), are deposited in the space between the insert and the surrounding walls of the cylinder head. After the engine has been operated for an extended period of time, the deposited residues completely obstruct the space between the insert and the surrounding walls of the cylinder head. Thus, the deposited residues prevent the expansion of the insert, and hence its application against the surrounding walls of the cylinder head. Since the deposited residues are poor conductors of heat (i.e., insulators), the heat generated during combustion in the auxiliary combustion chamber is transferred from the insert to the cylinder head only over the seat surfaces of the insert which contact the cavity in the vicinity of the auxiliary intake valve for the purpose of supporting the insert in the cavity.

However, heat dissipation through the seat surfaces of the insert cannot be sufficient, even if the insert is manufactured from a material having good heat conductivity, since the portion of the insert subjected to the highest temperatures (i.e., the portion in the vicinity of the connecting channel opening) is at the end of the insert furthest from the seat surfaces. Accordingly, in spite of comparatively high structural costs, the known stratified-charge internal combustion engines cannot effectively prevent the insert from exceeding the predetermined maximum temperature which may be attained when the engine is operating at higher load conditions, and hence cannot avoid consequent spontaneous ignitions due to excessive heat. These problems are amplified if the auxiliary intake valve is replaced by a fuel injection nozzle, since the auxiliary intake valve tends to cool the insert through the separate delivery of the fuel-rich mixture to the auxiliary combustion chamber.

SUMMARY OF THE INVENTION

It is an object of the present invention to provide a spark-ignited internal combustion engine, of the type operating with charge stratification, which avoids the difficulties and disadvantages of the prior art engines noted above.

This object, as well as other objects which will become apparent in the discussion that follows, are achieved, according to the present invention, by providing an insert of simple and low-cost construction which, in addition to rapidly heating an auxiliary combustion chamber formed within the insert during the cold-starting and warming-up phases of the engine, also ensures effective heat dissipation when the internal combustion engine is operating at higher loads.

In accordance with the present invention, the auxiliary combustion chamber is formed within a cup-shaped insert positioned in a cavity defined by surrounding walls of the cylinder head and opening toward a main combustion chamber. The cup-shaped insert is thin-walled and has an opening providing a passage connecting the main combustion chamber and the auxiliary combustion chamber. Since the cup-shaped insert is frictionally maintained in the cavity and opens away from the main combustion chamber, the insert may be manufactured from a comparatively simple and low-cost material, and, like a valve seat ring, may be press-fitted or force-fitted into the cavity in the cylinder head. The cup-shaped insert is also provided with a pair of openings for receiving a fuel delivery device and an ignition device, respectively. If one of the pair of openings is located on the side wall of the insert, either the fuel delivery device, such as a fuel injection nozzle, or the ignition device, such as a spark plug, may be used to prevent the insert from twisting. Preferably, the cup-shaped insert is manufactured from tubular or sheet metal material.

In accordance with another embodiment of the present invention, the side wall of the cup-shaped insert includes a plurality of regions spacedly arranged from one another and force-fittedly applied against the inner wall of the cavity, one of the regions being located adjacent the bottom of the cup-shaped insert in which is arranged the connecting passage opening. In addition to safely mounting the cup-shaped insert in the cavity, the force-fitted regions also achieve favorable thermal behavior of the insert over the entire operating range of the engine. Because only select regions of the insert are force-fittedly applied against the inner wall of the cavity, during the cold-starting and warming-up phases of the internal combustion engine, the auxiliary combustion chamber may be rapidly heated without excessive heat loss to the cylinder head; whereas during full-load operation, a sufficiently large surface area of the insert is in contact with the inner wall of the cavity for transferring the heat produced in the auxiliary combustion chamber to the surrounding walls of the cylinder head. The heat exchange is especially enhanced by the force-fitted region adjacent the bottom of the insert, since the highest temperatures occur there.

In order to achieve favorable combustion behavior, and, in particular, optimal ignition of a cylinder charge present in the main combustion chamber, the connecting passage opening arranged in the bottom of the insert is designed such that an ignition flame produced after ignition by the ignition device passes from the auxiliary combustion chamber into the main combustion chamber at a substantially flat angle relative to the horizontal. This may be achieved by sloping the bottom of the cup-shaped insert either continuously or stepwise away from the open-end of the cup-shaped insert. The bottom of the cup-shaped insert may also be outwardly curved toward the main combustion chamber, the connecting passage opening being eccentrically arranged relative to the axial axis of the cup-shaped insert on the side of the bottom of the insert closest to the central portion of the main combustion chamber. In either case, the shape of the bottom of the cup-shaped insert and the arrangement of the connecting passage opening ensure that the ignition flame produced after ignition by the ignition device passes from the auxiliary combustion chamber into the main combustion chamber at an angle which is slightly inclined relative to the horizontal, and thereby create a favorable condition for ignition in the main combustion chamber of a fuel-air mixture which is comparatively lean in fuel content.

BRIEF DESCRIPTION OF THE DRAWING

For a further understanding of the present invention, reference may be had to the accompanying drawing, in which.

DESCRIPTION OF THE PREFERRED EMBODIMENTS

Figure 1:
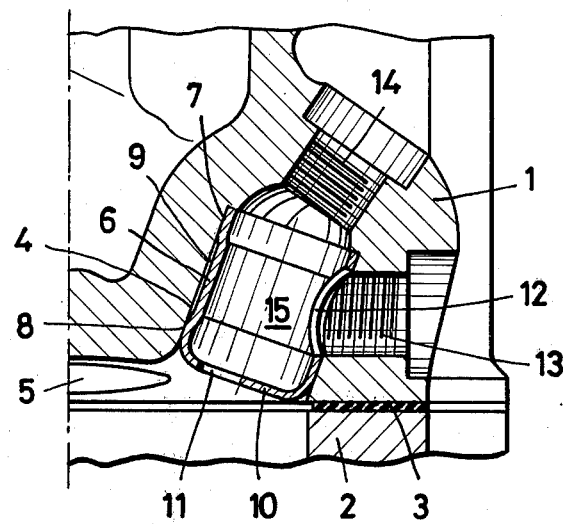
FIG. 1 is a longitudinal cross-sectional view through a cylinder head of an internal combustion engine operating with charge stratification and spark ignition and having a main combustion chamber and an auxiliary combustion chamber, formed with a cup-shaped insert located in a cavity of the cylinder head.

Referring now to FIG. 1, there is shown a cylinder head 1, a cylinder 2, and cylinder head gasket 3 of an internal combustion engine comprising several cylinders and operating with charge stratification. A cavity 4 delimited by surrounding walls of the cylinder head 1 opens toward a main combustion chamber 5. An auxiliary combustion chamber 15 is formed within a cup-shaped insert 6 which is frictionally maintained in the cavity 4 by force-fitted regions 7 and 8 on the side wall of the insert 6. Between the two force-fitted regions 7 and 8, the side wall of the insert 6 has a recessed portion 9 which forms an air space having an insulating effect relative to the surrounding walls of the cylinder head 1. The cup-shaped insert 6 is positioned in the cavity 4 with its open-end facing away from the main combustion chamber 5, the bottom 10 of the insert 6 facing toward the main combustion chamber 5. The bottom 10 of the insert 6 has an opening 11 for providing a passage connecting the auxiliary combustion chamber 15 with the main combustion chamber 5.

A transversal opening 12 in the side wall of the insert 6 is aligned with a threaded hole 13 in the cylinder head 1. Another threaded hole 14 in the cylinder head 1 communicates with the open-end of the cup-shaped insert 6. The threaded holes 13 and 14 are designed to receive an ignition device (e.g., a spark plug) and a fuel delivery device (e.g., a fuel injection nozzle). When a fuel injection nozzle is used, it injects fuel into the auxiliary combustion chamber 15 to form a fuel-rich mixture therein which is ignited by the ignition device. The fuel injection nozzle may be replaced by an auxiliary intake valve opening into the auxiliary combustion chamber 15 for delivering a comparatively fuel-rich, fuel-air mixture thereto.

The cup-shaped insert 6 may be thin-walled and manufactured from tubular or sheet metal material, and thus can be easily and economically produced. Because the force-fitted regions 7 and 8 are spacedly arranged from each other and separated by the recessed portion 9, the cup-shaped insert 6 is securely mounted in a position which ensures favorable thermal behavior. More particularly, the recessed portion 9 of the side wall of the insert 6 tends to insulate the auxiliary combustion chamber 15 from the cylinder head 1, thereby ensuring rapid heating of the auxiliary combustion chamber 15 during the cold-starting and warming-up phases of the internal combustion engine. On the other hand, the force-fitted region 8, which is located adjacent the connecting passage opening 11, provides efficient and rapid dissipation of heat produced in the auxiliary combustion chamber 15, especially when the engine is operating at higher loads.

In FIG. 1, the connecting passage opening 11 is arranged eccentrically in the bottom 10 of the insert 6 which is outwardly curved toward the main combustion chamber 5. This design ensures that an ignition flame produced after ignition of the fuel-rich mixture passes from the auxiliary combustion chamber 15 into the main combustion chamber 5 at a comparatively flat angle relative to the horizontal, and permits safe ignition of a cylinder charge in the main combustion chamber 5.

Figure 2:
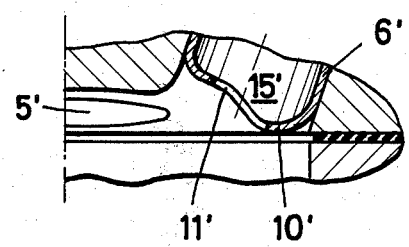
FIG. 2 is a cross-sectional view through a cylinder head of an internal combustion engine operating with charge stratification and spark ignition showing an alternate embodiment of the present invention.

Referring now to FIG. 2, a cup-shaped insert 6' has a bottom 10' which slopes down in a stepwise manner away from the open-end of the cup-shaped insert 6'. An opening 11' providing a passage connecting an auxiliary combustion chamber 15' and a main combustion chamber 5' is arranged in the sloping portion of the bottom 10' of the insert 6'. Thus, the alternate embodiment also permits an ignition flame to pass from the auxiliary combustion chamber 15' to the main combustion chamber 5' at a comparatively flat angle relative to the horizontal.

It will be understood that the above described embodiments are merely exemplary and that persons skilled in the art may make many variations and modifications without departing from the spirit and scope of the invention. All such modifications and variations are intended to be included within the scope of the invention as defined in the appended claims.

We claim:

1. In a spark ignited internal combustion engine operated with charge stratification and including a cylinder head having a main combustion chamber, a cavity defined by surrounding walls of the cylinder head, and an auxiliary combustion chamber formed within a cup-shaped insert positioned in the cavity, the cup-shaped insert being thin-walled and having an opening providing a passage connecting the main combustion chamber and the auxiliary combustion chamber, an opening for receiving a fuel delivery device and an opening for receiving an ignition device; the improvement wherein:

the cavity opens toward the main combustion chamber and the cup-shaped insert opens away from the main combustion chamber, the side wall of the cup-shaped insert having a plurality of regions spacedly arranged from one another and force-fittedly applied against the inner wall of the cavity to frictionally maintain the insert in the cavity.

2. The internal combustion engine of claim 1, wherein the cup-shaped insert in force-fitted in the cavity.

3. The internal combustion engine of claim 1, wherein the cup-shaped insert in manufactured from tubular material.

4. The internal combustion engine of claim 1, wherein the cup-shaped insert is manufactured from sheet metal material.

5. The internal combustion engine of claim 1, wherein the connecting passage opening is located in the bottom of the cup-shaped insert.

6. The internal combustion engine of claim 5, wherein the connecting passage opening in designed such that an ignition flame produced after ignition by an ignition device advances from the auxiliary combustion chamber into the main combustion chamber at a substantially flat angle relative to the horizontal.

7. The internal combustion engine of claim 6, wherein the bottom of the cup-shaped insert in outwardly curved toward the main combustion chamber; and the connecting passage opening is eccentrically positioned relative to the axial axis of the cup-shaped insert on the side of the bottom of the cup-shaped insert closest to the central portion of the main combustion chamber.

8. The internal combustion engine of claim 6, wherein the bottom of the cup-shaped insert is continuously sloping away from the open-end of the cup-shaped insert.

9. The internal combustion engine of claim 6, wherein the bottom of the cup-shaped insert is sloping in stepwise manner away from the open-end of the cup-shaped insert.

10. The internal combustion engine of claim 1, wherein one of the forced-fitted regions is location adjacent the bottom of the cup-shaped insert.

* * * * *